United States Patent

Miyakawa

[11] Patent Number: 5,330,387
[45] Date of Patent: Jul. 19, 1994

[54] ELASTIC COUPLING

[75] Inventor: Shinji Miyakawa, Kasugai, Japan

[73] Assignee: Tokai Rubber Industries, Ltd., Komaki, Japan

[21] Appl. No.: 139,048

[22] Filed: Oct. 21, 1993

Related U.S. Application Data

[63] Continuation of Ser. No. 828,572, Jan. 31, 1992.

[30] Foreign Application Priority Data

Feb. 5, 1991 [JP] Japan .................. 3-003961[U]

[51] Int. Cl.⁵ .................. F16D 3/78; F16D 3/58
[52] U.S. Cl. .................. 464/93; 464/147
[58] Field of Search .................. 464/93, 92, 87, 147; 403/270, 271, 269, 272

[56] References Cited

U.S. PATENT DOCUMENTS

| | | | |
|---|---|---|---|
| 411,637 | 9/1889 | Batchelor | 403/270 X |
| 1,363,355 | 12/1920 | Sander | 403/270 X |
| 1,642,484 | 9/1927 | Burgett | 403/270 X |
| 2,566,646 | 9/1951 | Whitaker | 403/271 X |
| 4,182,139 | 1/1980 | Hornig et al. | 464/93 |
| 4,790,794 | 12/1988 | Takeda et al. | 464/93 |
| 5,033,988 | 7/1991 | McGuire et al. | 464/93 X |

FOREIGN PATENT DOCUMENTS

| | | | |
|---|---|---|---|
| 516038 | 9/1966 | Italy | 464/93 |
| 2482 | 1/1970 | Japan | 464/93 |
| 696719 | 9/1953 | United Kingdom | 464/93 |
| 707524 | 4/1954 | United Kingdom | 464/93 |

Primary Examiner—Clifford D. Crowder
Assistant Examiner—John J. Calvert
Attorney, Agent, or Firm—Jacobson, Price, Holman & Stern

[57] ABSTRACT

In an elastic coupling including first fixtures, second fixtures, a reinforcing member in a loop-like shape and an elastic covering member, the reinforcing member is made by connecting one longitudinal end and the other longitudinal end of a stranded wire. The stranded wire is formed by twisting the appropriate number of metallic wires. Since the metallic wires do not shrink by heat, the metallic wires do not shrink during the vulcanization. Thus, the variety of the spring constant of the elastic coupling can be reduced. Also, since the metallic wires are very strong, the number of winding the stranded wire around the first fixtures and the second fixtures can be reduced and therefore the size of the elastic coupling can be prevented from increasing.

9 Claims, 3 Drawing Sheets

ELASTIC COUPLING

This application is a continuation of application Ser. No. 07/828,572, filed Jan. 31, 1992.

BACKGROUND OF THE INVENTION

1. Field of the Invention

The present invention relates to an elastic coupling which is disposed between two shafts and absorbs the vibrations, shocks and the like of the shafts.

2. Description of the Related Art

A conventional elastic coupling comprises at least two first fixtures which are disposed at equal intervals on a circumference of a central axis line, second fixtures which are as many as the first fixtures and are disposed at equal intervals on the circumference of the central axis line and between the neighboring two first fixtures, a reinforcing member in a loop-like shape which connects the neighboring first fixtures and second fixtures, and an elastic covering member which is made of rubber and covers the first fixtures, the second fixtures and the reinforcing member by adhesion with vulcanization.

The reinforcing member is made by using a plurality of cords composed of organic fibers such as polyester, nylon or the like, forming a stranded cord by twisting the appropriate number of the cords together so as to obtain necessary rigidity, and then winding the stranded cord around the neighboring first fixtures and second fixtures in a multiple manner.

When using this conventional elastic coupling, the first fixtures are connected to one of two shafts and the second fixtures are connected to the other of the shafts.

In the conventional elastic coupling using the stranded cord composed of organic fibers such as polyester, nylon or the like, the organic fibers shrink due to the heat during the vulcanization and the degrees of shrinkage of the organic fibers vary inevitably. Also, in order to enhance the rigidity of the elastic coupling, the number of times of winding the reinforcing member around the first fixtures and the second fixtures has to be increased. However, when the number of the winding times is increased, irregular winding tends to happen. Therefore, there is a limit in reducing the variety of the spring constant of the conventional elastic coupling. Also, when the number of the winding times is increased, the size of the elastic coupling tends to be increased.

SUMMARY OF THE INVENTION

The present invention has been developed in view of the circumstances described above. It is therefore an object of the present invention is to provide an elastic coupling which solves the problem of the variety of the spring constant and is free from the increase in size.

The elastic coupling for connecting two shafts according to the present invention comprises:

at least two first fixtures which are disposed at equal intervals on a circumference of a central axis line and are to be connected to one of the shafts;

second fixtures which are as many as the first fixtures, are disposed at equal intervals on the circumference of the central axis line and between the neighboring first fixtures, and are to be connected to the other of the shafts;

reinforcing members in a loop-like shape for connecting each of the neighboring first fixtures and second fixtures; and an elastic covering member which covers the first fixtures, the second fixtures and the reinforcing member, the reinforcing member being constituted by connecting one longitudinal end and the other longitudinal end of a stranded wire which is formed by twisting metallic wires together.

The degree of twisting the stranded wire which constitutes the reinforcing member may be selected in accordance with the rigidity required for the elastic coupling. The average diameter of the stranded wire may be in a range from 0.6 mm to 3 mm. The diameter and the material of the metallic wires constituting the stranded wire can be selected in accordance with the rigidity required for the elastic coupling. For example, the average diameter of the metallic wires may be in a range from 0.15 mm to 0.5 mm, and the material of the respective metallic wires may be mild steel, semi-hard steel, hard steel, stainless steel or so on, and in some oases may be a titanium alloy, or an aluminum alloy. The number of the metallic wires twisted together may be selected appropriately in a range from three to forty-nine. The method of stranding the metallic wires can be appropriately selected in accordance with the necessary rigidity and tensile strength, and may be simple twisting, twisting around a core cord, or compounding twisting. In some cases, the reinforcing member may be made by using a composite stranded wire which is formed by twisting metallic wires and organic fiber cords such as of nylon, together. The connection of one end and the other end of the stranded wire may be made by fusion and in some oases by squeezing them, and further it can be made by fusion after squeezing them.

Fusion can be made in a state that one longitudinal end of a stranded wire faces the other longitudinal end of the stranded wire, and in some oases may be made in a state that the one longitudinal end overlaps the other longitudinal end. The method of fusion may be, for example, butt resistance welding in which a butt joint is heated by the resistance heat. The butt resistance welding may be upset butt welding in which a butt joint is heated by the resistance heat and then pressure is applied at the joint, or may be flash butt welding in which a butt joint is produced by passing an electric current through the two ends of a wire in light contact to create an arc which causes flashing and consequent heating and then pressure is applied at the joint. Further, in some cases, the method of fusion may be gas pressure welding in which a joint is heated by a gas flame, or may be brazing in which a joint is connected by the adhesion of a filler metal with a melting point lower than that of the base metals.

In the present invention, when the ends are fused, since the melted metal seeps on the outer periphery of the metallic wires at the joint due to surface tension, the connection is enhanced.

The operation of the elastic coupling will be hereinafter described together with the usage thereof.

When putting the elastic coupling in service, the first fixtures are connected to one of the two shafts, and the second fixtures are connected to the other of the shafts. Under this situation, the driving one of the shafts rotates, the driven one of the two shafts rotates by way of the elastic coupling.

At this moment, tensile force is applied on the reinforcing member in the rotating direction, and that reinforcing member tends to elongate by the tensile force, but since one longitudinal end of the stranded wire is connected to the other longitudinal end, the one end and the other end are not disconnected from each other at the joint.

Hence, according to the elastic coupling of the present invention, since the two longitudinal ends of the stranded wire which is made by twisting the metallic wires are connected together in the reinforcing member, the problem of the variety of the spring constant can be solved and the size of the elastic coupling can be prevented from increasing.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure:

FIGS. 1 through 4 relate to an elastic coupling of a First Preferred Embodiment according to the present invention, wherein;

FIG. 1 is a side elevation of a stranded wire;

FIG. 2 is a side elevation of the stranded wire having a fused joint;

FIG. 3 is a perspective view of first fixtures, second fixtures and the stranded wire in the process of producing the elastic coupling; and FIG. 4 is a plan view of the elastic coupling;

DETAILED DESCRIPTION OF THE PREFERRED EMBODIMENTS

Figure 1:
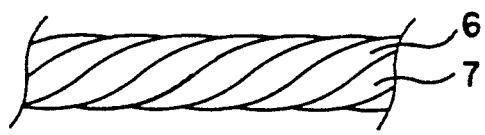

Having generally described the present invention, a further understanding can be obtained by reference to the specific preferred embodiments which are provided herein for purposes of illustration only and are not intended to limit the scope of the appended claims.

First Preferred Embodiment

The elastic coupling of the First Preferred Embodiment according to the present invention will be hereinafter described with reference to FIGS. 1 through 4.

This elastic coupling comprises two first fixtures 1, two second fixtures 2, reinforcing members 3 and 4 which connect the neighboring first fixtures 1 and second fixtures 2 in an "O"-shape in a loop-like manner, and an elastic covering member 5.

The first fixtures 1 are made of metal and respectively have a cylindrical shape having a central bore 10, and are disposed at equal intervals on a circumference of a central axis line "P".

The second fixtures 2 have the same size as the first fixtures 1, are made of metal and respectively have a cylindrical shape having a central bore 20, and are disposed at equal intervals on the circumference of the central axis line "P". The second fixtures 2 are disposed at equal intervals between the neighboring two first fixtures 1.

The elastic covering member 5 is made of rubber and covers the first fixtures 1, the second fixtures 2, and the reinforcing members 3 and 4. The elastic covering member 5 has a central bore 50.

Figure 2:
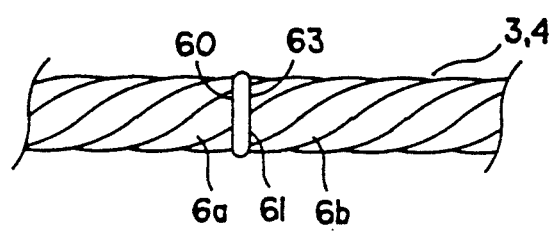

FIG. 1 shows a side elevation of a stranded wire 6 which constitutes each of the reinforcing members 3 and 4. In this preferred embodiment, the long stranded wire 6 is made by twisting four steel wires 7 having a diameter of about 0.15 mm to 0.5 mm. The average diameter of the stranded wire 6 is about 0.6 mm to 3 mm. The stranded wire 6 is out to a predetermined length with a cutter. Each of the out stranded wires is made into a ring shape, and a cut surface 60 of one longitudinal end 6a of the stranded wire 6 is made to face a out surface 61 of the other longitudinal end 6b. Then the one end 6a and the other end 6b are fused by resistance heat to form a fused joint 63. Thus the one end 6a and the other end 6b are connected and the reinforcing members 3 and 4 in a loop-like shape are produced. It should be noted that the cut surfaces 60 and 61 of the ends 6a and 6b of the stranded wire 6 before fusing are substantially perpendicular to the central axis of the stranded wire 6. FIG. 2 shows the fused joint 63 of the one end 6a and the other end 6b.

Figure 3:
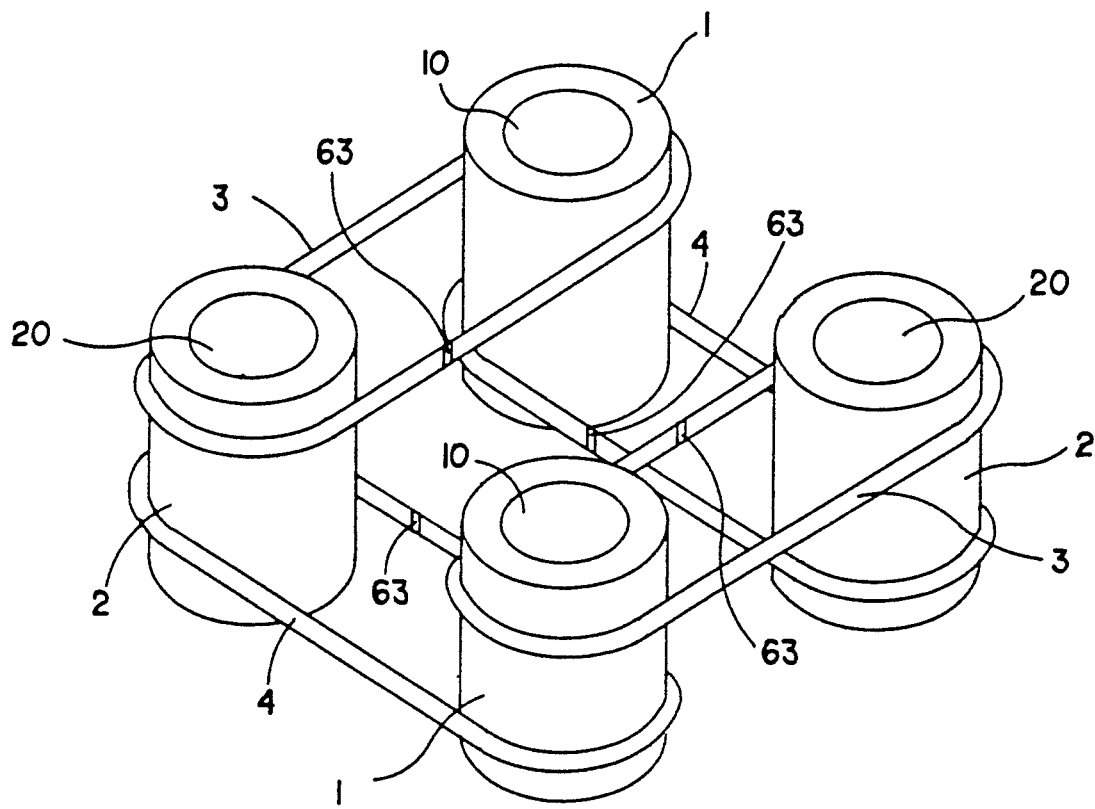
Figure 4:
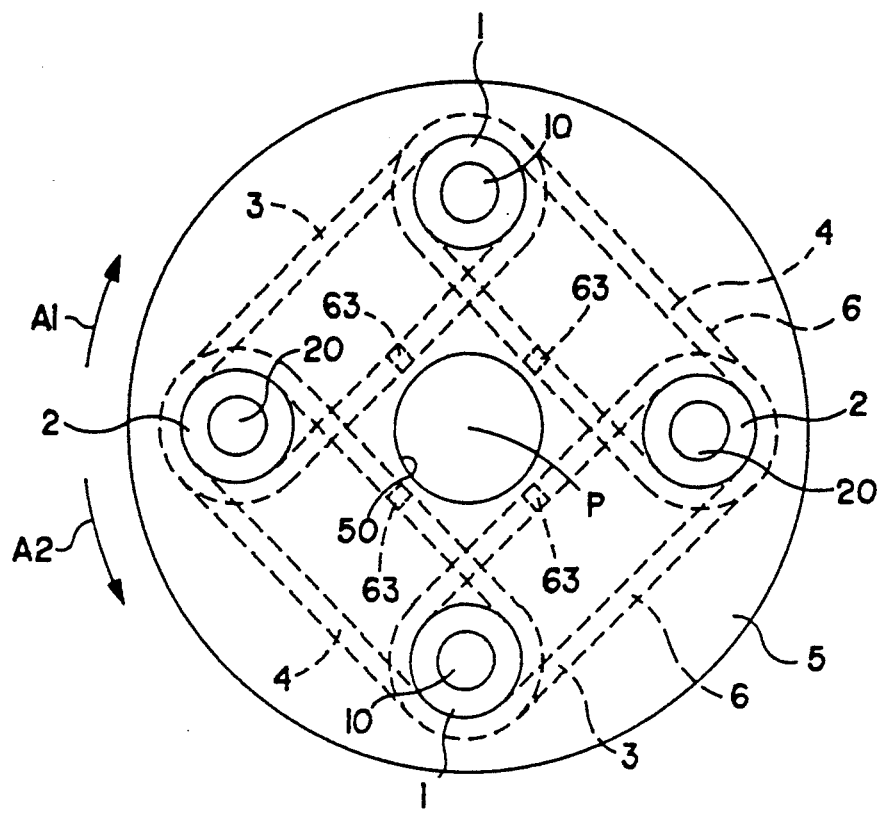

In FIGS. 3 and 4, fused joint 63 is shown located at a radially innermost side of the loop-like "O" shape adjacent to central axis line P.

Then, as shown in FIG. 3, the first fixtures 1 and the second fixtures 2 are placed in the cavity of a mold (not shown), and the reinforcing members 3 and 4 are wound around the neighboring first fixtures 1 and second fixtures 2 in an "O"-shape in a loop-like manner.

After that, rubber is introduced to the cavity of the mold and vulcanized. The elastic covering member 5 is thus formed.

The operation of the elastic coupling of the First Preferred Embodiment will be hereinafter described together with the usage thereof. When putting the elastic coupling in service, the first fixtures 1 are connected to one of two shafts by screwing a nut on a bolt which penetrates each of the central bores 10 of the first fixtures 1, and the second fixtures 2 are connected to the other one of the shafts by screwing a nut on a bolt which penetrates each of the central bores 20 of the second fixtures 2. Under this situation, the driving one of the shafts rotates, the driven one of the shafts rotates by way of the first fixtures 1 and the second fixtures 2.

Suppose that the elastic coupling rotates in the direction of an arrow A1 in FIG. 4 in a state that the first fixtures 1 are connected to the driving one of the two shafts and the second fixtures 2 are connected to the driven one of the shafts. Since the first fixtures 1 connected to the driving shaft drives in the direction of the arrow A1, tensile force is applied on the reinforcing members 3, and at the same time compressive force is applied on the reinforcing members 4.

On the other hand, suppose that the elastic coupling rotates in the opposite direction, that is, the direction of an arrow A2 in FIG. 4. At this time, since the first fixtures 1 drives in the direction of the arrow A2, tensile force is applied on the reinforcing members 4, and at the same time compressive force is applied on the reinforcing members 3.

As mentioned above, tensile force is applied on the reinforcing members 3 or 4 when the elastic coupling is in service. However, since the one longitudinal end 6a of the stranded wire 6 constituting the reinforcing members 3 and 4 is connected to the other longitudinal end 6b of the stranded wire 6 at the fused joint 63, the one end 6a and the other end 6b will not be disconnected from each other. Particularly in this Preferred Embodiment, the melted metal seeps on the outer periphery of the metallic wires 7 at the joint 63 due to surface tension, the connected area is increased and thus the connection is further enhanced.

As described above, in the First Preferred Embodiment, the stranded wire 6 constituting the reinforcing members 3 and 4 are formed of the metallic wires 7, and accordingly the problem of the variety of the shrinkage of the stranded wire 6 by the heat during the vulcanization can be solved. Also, as being different from the stranded cords composed of organic fibers such as polyester or nylon in the conventional elastic coupling, the metallic wires 7 of the stranded wire 6 constituting the reinforcing members 3 and 4 of this First Preferred Embodiment are very strong. Therefore, the reinforcing members 3 and 4 need not be wound in a multiple manner and the problem of the irregular winding can be solved. Thus, the variety of the spring constant of the elastic coupling can be reduced in this preferred embodiment. In addition, since the metallic wires 7 are very strong and the reinforcing members 3 and 4 need not be wound in a multiple manner, the size of the elastic coupling can be prevented from increasing.

Second Preferred Embodiment

Figure 5:
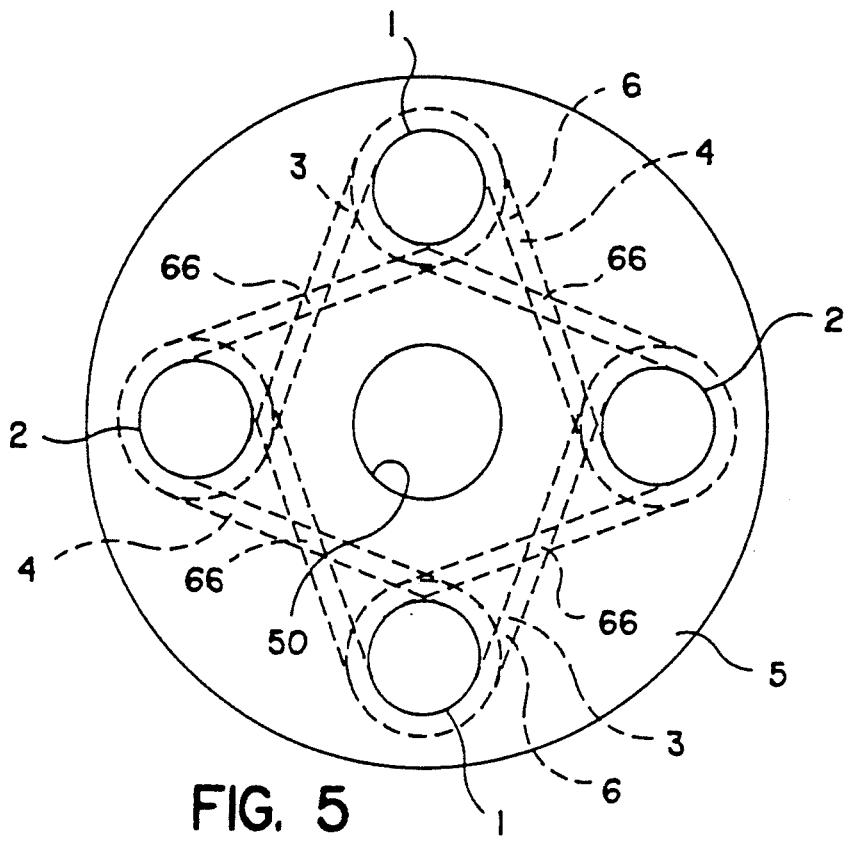
FIG. 5 is a plan view of an elastic coupling of a Second Preferred Embodiment according to the present invention.

The elastic coupling according to the Second Preferred Embodiment of the present invention will be hereinafter described with reference to FIG. 5.

The elastic coupling of the Second Preferred Embodiment basically has an identical construction with that of the elastic coupling of the First Preferred Embodiment except components described below. Accordingly, the components of the Second Preferred Embodiment identical with those of the First Preferred Embodiment will be described with identical reference numerals. Reinforcing members 3 and 4 of the Second Preferred Embodiment are formed of a stranded wire 6 which is made by twisting metallic wires together, and the reinforcing members 3 and 4 of the Second Preferred Embodiment are wound around the neighboring first fixtures 1 and second fixtures 2 in an "8"-shape in a loop-like manner. A clamp 66 is held in the center of each of the reinforcing members 3 and 4, thereby forming an "8"-shape in a loop-like manner.

Basically, the elastic coupling of the Second Preferred Embodiment works and effects advantages in a manner similar to that of the First Preferred Embodiment. In addition, since the reinforcing members 3 and 4 are in an "8"-shape in a loop-like manner, high torsional strength can be obtained.

Third Preferred Embodiment

Figure 6:
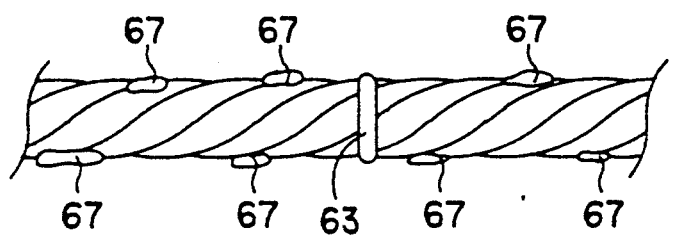
FIG. 6 is a plan view of a stranded wire of an elastic coupling of a Third Preferred Embodiment according to the present invention.

The elastic coupling of the Third Preferred Embodiment according to the present invention has a stranded wire 6 shown in FIG. 6.

In this stranded wire 6, the outer peripheries of metallic wires 7 are connected together by way of bonding portions 67 formed by welding, brazing or the like, so the metallic wires 7 are firmly and securely made into one wire. Therefore, even if high tensile force is applied on the stranded wire 6, the metallic wires 7 constituting the stranded wire 6 can be prevented from getting loose, and thus the elastic coupling can have high rigidity.

Having now fully described the present invention, it will be apparent to one of ordinary skill in the art that many changes and modifications can be made thereto without departing from the sprit or scope of the present invention as set forth herein including the appended claims.

What is claimed is:

1. An elastic coupling for connecting two shafts comprising:

at least two first fixtures which are disposed at equal intervals on a circumference of a central axis line and are to be connected to one of the shafts;

second fixtures which are as many as said first fixtures, are disposed at equal intervals on said circumference of said central axis line and between two adjacent first fixtures, and are to be connected to the other of the shafts;

reinforcing members formed of twisted metallic wire strands extending in a loop-like shape for connecting each of said neighboring first fixtures and second fixtures; and an elastic covering member which covers said first fixtures, said second fixtures and said reinforcing members, said elastic covering member being formed coaxially with said central axis line, each of said reinforcing members being constituted by welding one longitudinal end and the other longitudinal end of said twisted metallic wire strands in a welding joint portion, said reinforcing member being wound around said first fixtures and said second fixtures in an "O"-shape of said loop-like shape, said welding joint portion being located at a radially innermost side of said "O"-shape adjacent to said central axis line.

2. An elastic coupling according to claim 1, wherein said stranded wire has an average diameter in a range from 0.6 mm to 3 mm.

3. An elastic coupling according to claim 1, wherein said metallic wires respectively have an average diameter in a range from 0.15 mm to 0.5 mm.

4. An elastic coupling according to claim 1, wherein said metallic wires are made of one of mild steel, semi-hard steel, stainless steel, a titanium alloy, and an aluminum alloy.

5. An elastic coupling according to claim 1, wherein said metallic wires twisted together are in a range from three to forty-nine.

6. An elastic coupling according to claim 1, wherein said welding joint portion is a butt resistance welding joint portion.

7. An elastic coupling according to claim 1, wherein said one longitudinal end and said other longitudinal end of said stranded wire are connected together by fusion after being squeezed.

8. An elastic coupling according to claim 1, wherein said metallic wires twisted together have bonding portions on peripheries thereof, thereby being made into said reinforcing members.

9. An elastic coupling according to claim 1, wherein said one longitudinal end and said other longitudinal end of said stranded wire are connected together with said one longitudinal end facing said other longitudinal end.

* * * * *